US008463538B2

(12) United States Patent
Marion et al.

(10) Patent No.: US 8,463,538 B2
(45) Date of Patent: Jun. 11, 2013

(54) ASSISTANCE PROCESS AND DEVICE FOR MANAGING AN IN-FLIGHT REFUELING

(75) Inventors: Gaëtan Marion, Beauzelle (FR); Bertrand Boinon, Colomiers (FR); Nicolas Ferret, Balma (FR); Franck Artini, Toulouse (FR); Philippe Foucault, Blagnac (FR); François Melin, Toulouse (FR)

(73) Assignee: Airbus Operations (SAS), Toulouse (FR)

(*) Notice: Subject to any disclaimer, the term of this patent is extended or adjusted under 35 U.S.C. 154(b) by 445 days.

(21) Appl. No.: 12/818,926

(22) Filed: Jun. 18, 2010

(65) Prior Publication Data

US 2010/0332055 A1 Dec. 30, 2010

(30) Foreign Application Priority Data

Jun. 24, 2009 (FR) ..................................... 09 03058

(51) Int. Cl.
*G05D 1/00* (2006.01)
*G05D 3/00* (2006.01)
*G01C 23/00* (2006.01)
*G06F 17/10* (2006.01)

(52) U.S. Cl.
USPC .............................. 701/302; 701/3; 244/75.1

(58) Field of Classification Search
USPC ... 701/1, 3, 4, 302; 244/135 A, 75.1; 340/945
See application file for complete search history.

(56) References Cited

U.S. PATENT DOCUMENTS

| | | | | |
|---|---|---|---|---|
| 3,917,196 | A * | 11/1975 | Pond et al. | 342/23 |
| 6,752,357 | B2 * | 6/2004 | Thal et al. | 244/135 A |
| 6,819,982 | B2 * | 11/2004 | Doane | 701/3 |
| 8,132,759 | B2 * | 3/2012 | Von Thal | 244/135 A |
| 2002/0193915 | A1 | 12/2002 | Miller | |
| 2003/0093187 | A1 * | 5/2003 | Walker | 701/1 |
| 2004/0122567 | A1 * | 6/2004 | Gaier | 701/4 |
| 2004/0182966 | A1 | 9/2004 | Schneider et al. | |
| 2005/0045768 | A1 * | 3/2005 | Saggio et al. | 244/135 A |
| 2006/0004496 | A1 * | 1/2006 | Tucker et al. | 701/4 |
| 2007/0023576 | A1 * | 2/2007 | Schroeder | 244/135 A |
| 2008/0265097 | A1 * | 10/2008 | Stecko et al. | 244/135 A |
| 2010/0286900 | A1 * | 11/2010 | Depape et al. | 701/120 |
| 2010/0292871 | A1 * | 11/2010 | Schultz et al. | 701/3 |
| 2011/0180666 | A1 * | 7/2011 | Speer et al. | 244/135 A |

OTHER PUBLICATIONS

Altus KC-135 and C-17 Air Refueling Study Guide, Aug. 19, 2004.*
ATP-56(B) Air-to-Air Refueling, NATO, Dec. 14, 2008, pp. 1-1 to 1G-4.*
ATP-56(B) Air-to-Air Refuelling, NATO, Dec. 14, 2008, pp. 1-1-1G-4.

* cited by examiner

*Primary Examiner* — Fadey Jabr
*Assistant Examiner* — Thomas Ingram
(74) *Attorney, Agent, or Firm* — Novak Druce Connolly Bove + Quigg LLP

(57) ABSTRACT

An assisting process and device for managing an in-flight refueling is disclosed. The device (1) comprising means (3) for automatically calculating a distance between aircrafts, at which a meeting phase for an in-flight refueling should be initiated.

14 Claims, 6 Drawing Sheets

ASSISTANCE PROCESS AND DEVICE FOR MANAGING AN IN-FLIGHT REFUELING

CROSS-REFERENCE TO RELATED APPLICATIONS

This application claims priority to French Patent Application 0903058, filed Jun. 24, 2009, the contents of which are incorporated herein by reference.

FIELD OF THE INVENTION

The present invention relates to an assistance process and device for managing on a refueling aircraft an air meeting phase with a receiving aircraft, for example, a fighter plane, for in-flight refueling said receiving aircraft by said refueling aircraft.

The present invention further relates to an assistance method and system for managing an in-flight refueling, respectively using a method and a device such as the above mentioned ones.

BACKGROUND OF THE INVENTION

Although not exclusively, the present invention particularly applies to the military field, i.e. to the situation where two military airplanes are to meet for refueling one by the other.

It is known that, generally, refueling successively comprises the following phases:

- a waiting phase, during which the refueling aircraft is in the air on a waiting circuit waiting for the receiving aircraft;
- a meeting phase, during which the two aircrafts are positioned in order to be able to carry out refueling; and
- a refueling phase as such, during which the two aircrafts fly along a refueling circuit implementing said refueling.

When the receiving aircraft is on the way for the refueling circuit, it takes a contact, via radio, with the refueling aircraft for coordinating their positions. The refueling aircraft then leaves the waiting circuit for reaching the receiving aircraft upon the meeting phase.

The procedures to be implemented during the meeting phase are accurately defined in a document published by the NATO (North Atlantic Treaty Organization). This document referred to as ATP56(B) dated 1 Apr. 2007 defines the standards and the international regulations for perfectly implementing in a safe way the meeting and in-flight refueling procedures. For this, the NATO has defined several types of in-flight meeting procedures, i.e.:

- a meeting of the A type (referred to as ALPHA);
- a meeting of the B type (referred to as BRAVO);
- a meeting of the C type (referred to as CHARLIE);
- a meeting of the D type (referred to as DELTA);
- a meeting of the E type (referred to as ECHO);
- a meeting of the F type (referred to as FOX-TROT);
- a meeting of the G type (referred to as GOLF).

Using such procedures depends on the operational context (conflict, training, etc.), on the equipment on board the aircrafts, as well as their accuracy. The B, C and D type procedures are implemented in a completely autonomous way by both aircrafts, that is to say that no means being external to these two aircrafts interferes in the progress of the meeting phase. More precisely:

- a B type procedure suggests that the two aircrafts face each other on a same trajectory, and at a predetermined engaging distance, the refueling aircraft starts a turn with respect to its initial heading at a constant angle of turn, for performing a half-turn, whereas the receiving aircraft remains on its trajectory;
- a C type procedure suggests that the two aircrafts face each other on one single trajectory and at a predetermined engagement distance, the refueling aircraft starts a turn with respect to its initial heading at a constant angle of turn. The receiving airplane also starts a turn in order to be laterally shifted and be on the same (new) trajectory and in the same direction as the refueling aircraft; and
- a D type procedure suggest that the two aircrafts face each other, but are laterally shifted by a predetermined lateral distance. At a predetermined engagement distance, the refueling aircraft starts a turn with respect to its initial heading, whereas the receiving aircraft remains on its trajectory.

The three B, C and D type procedures require from the refueling aircraft that it accurately observes the relative distance with respect to the receiving aircraft, in order to start a final turn exactly at the predetermined corresponding engagement distance, in order to initiate the meeting phase. At the end of the meeting phase, the two aircrafts integrate the refueling circuit and implement the refueling operation as such.

SUMMARY OF THE INVENTION

The present invention relates to an in-flight refueling, for which the meeting phase is an autonomous phase, and preferably corresponds to one of the above mentioned B, C and D procedures. For initiating such a meeting phase, the distance between the two aircrafts and optionally, the above mentioned lateral distance are determined by the crews of the aircrafts, through tables shown on a paper medium, being set forth appended to the above mentioned document ATP56(B). Such tables can be applied to any type of aircraft. Consequently, the crews of the aircrafts determine such distances through said tables, and this, taking more specifically into account the velocities, the altitudes and the wind drift of each of the refueling and receiving aircrafts.

Such a method for determining the start of the meeting phase involves a lot of drawbacks. In particular,

- it requires a significant work load from the crews, with more specifically, the requirement to determine said distances and to observe the relative position between the aircrafts;
- as such an observation operation is not accurate, there is thus a significant risk of failure with respect to engaging the meeting phase, with a bank being triggered too early or too late by the refueling airplane;
- the above mentioned distances that are obtained by means of tables are limited to two values of the angle of turn (15° and)25°, including for restricting the volume of paper documents, limiting the implementation of the meeting phase; and
- such distances do not take into account the turning of the refueling aircraft, that could vary depending on the type of aircraft.

Thus, the engagement of the meeting phase in a refueling operation, such as implemented nowadays, is not satisfactory.

The aim of the present invention is to overcome the above mentioned drawbacks. It relates to an assistance process for managing on a refueling aircraft an air meeting phase with a receiving aircraft, for an in-flight refueling of said receiving aircraft by said refueling aircraft, said refueling and receiving aircrafts flying one towards the other, said process allowing to assist the pilot of the refueling aircraft to initiate accurately and with a reduced work load the meeting phase.

To this end, according to this invention, said process is remarkable in that, on said refueling aircraft:

a) means are provided for generating a plurality of parameters comprising at least:
   the current velocity of the refueling aircraft;
   the current altitude of the refueling aircraft;
   the current velocity of the receiving aircraft;
   the current altitude of the receiving aircraft;
   a turn characteristic of the refueling aircraft;
   a turning time taking into account the performance of the refueling aircraft; and
   a separation distance between the two aircrafts at the end of the meeting phase;
b) using said parameters, at least one engagement distance is automatically calculated corresponding to the distance between the two aircrafts at which the meeting phase should be initiated;
c) the current positions are determined of said refueling and receiving aircrafts; and
d) there are automatically shown on at least one viewing screen of the refueling aircraft, at least:
   one indicator showing said engagement distance being defined with respect to the current position of the refueling aircraft, at least at the front of the latter; and
   one symbol indicating the current position of the receiving aircraft.

Thus, by means of this invention, the engagement distance is determined automatically, corresponding to the distance between the two aircrafts at which the meeting phase should be initiated. Thus, a particularly accurate engagement distance is obtained. Furthermore, the calculation of such a distance being carried out automatically does not require any crew member to interfere. This enables to considerably reduce the work load of the crew in the refueling aircraft. Moreover, as said engagement distance is shown in the shape of an indicator (being represented at the front of the current position of the refueling aircraft), the pilot of the refueling aircraft exactly knows when he should initiate the meeting phase, namely at the time when said indicator is superposed on a symbol (also shown) indicating the current position of the receiving aircraft. Thus, the assistance process for managing the air meeting phase enables to significantly reduce the failure rates existing with the current methods.

In a first embodiment, intended for a meeting phase corresponding to one of the following procedures: a B type procedure and a C type procedure, there is generated in step a), as a turn characteristic, the constant value of the turn angle, to be implemented by the refueling aircraft at the start of the meeting phase. Moreover, in a second embodiment, intended for a meeting phase corresponding to a D type procedure:

- in step a), one of the following turns is selected: a constant radius turn and a constant roll angle turn; and
- in addition, a lateral distance is determined between the respective trajectories of the refueling and receiving aircrafts, being parallel, said lateral distance being used to calculate said engagement distance.

In this second embodiment, preferably said lateral distance is automatically calculated, taking into account a drift generated by the (estimated or measured) local wind. Such a wind corresponds to a wind being captured by the pilot or to the most accurate and reliable wind being available on the aircraft.

The present invention also relates to an assistance method for managing an in-flight refueling of a receiving aircraft by a refueling aircraft, said refueling successively comprising:

- a waiting phase for the refueling aircraft;
- a meeting phase; and
- a refueling phase.

According to this invention, such a method is remarkable in that, during said waiting phase, the above specified assistance process is implemented on the refueling aircraft for managing (i.e. initiating) said meeting phase.

Moreover, advantageously, means are arranged on the refueling aircraft allowing an operator of said refueling aircraft to create independently two flight circuits, namely a waiting circuit intended to be followed by the refueling aircraft during the waiting phase and a refueling circuit intended to be followed by said refueling aircraft during the refueling phase.

It is to be noticed that the parameters of the two circuits are sometimes identical (length, turn direction, turn angle, etc.), except that the dimensions of the refueling circuit are much bigger than those of the waiting circuit.

In addition, advantageously, integration means are provided on the refueling aircraft intended for integrating into the flight plan of the latter one of said two flight circuits as an active element of the flight plan, the other circuit being then inactive.

Integrating a circuit into a flight plan can be done manually. However, preferably, said integration means are able to automatically integrate a flight circuit into the flight plan.

The present invention further relates to an assistance device for managing an air meeting phase of a refueling aircraft with a receiving aircraft, for an in-flight refueling of said receiving aircraft by said refueling aircraft, said refueling and receiving aircrafts flying one towards the other.

According to this invention, said device is remarkable in that it is on board said refueling aircraft and comprises:

- means for generating a plurality of parameters comprising at least:
   - the current velocity of the refueling aircraft;
   - the current altitude of the refueling aircraft;
   - the current velocity of the receiving aircraft;
   - the current altitude of the receiving aircraft;
   - a turn characteristic of the refueling aircraft;
   - a turning time taking into account the performance of the refueling aircraft; and
   - a separation distance between the two aircrafts at the end of the meeting phase;
- means for automatically calculating, using said parameters, at least one engagement distance corresponding to the distance between the two aircrafts at which the meeting phase should be initiated;
- means for determining the current positions of said refueling and receiving aircrafts; and
- display means for automatically showing, on at least one viewing screen of the refueling aircraft, at least:
   - one indicator showing said engagement distance being defined with respect to the current position of the refueling aircraft, at least at the front of the latter; and
   - one symbol indicating the current position of the receiving aircraft.

The present invention also relates to an assistance system for managing an in-flight refueling comprising a device such as above mentioned, as well as a refueling aircraft comprising such a device and/or such a system.

BRIEF DESCRIPTION OF THE DRAWINGS

The figures on the appended drawing will better explain how this invention can be implemented. In these figures, like reference numerals relate to like components.

DETAILED DESCRIPTION

Figure 1:
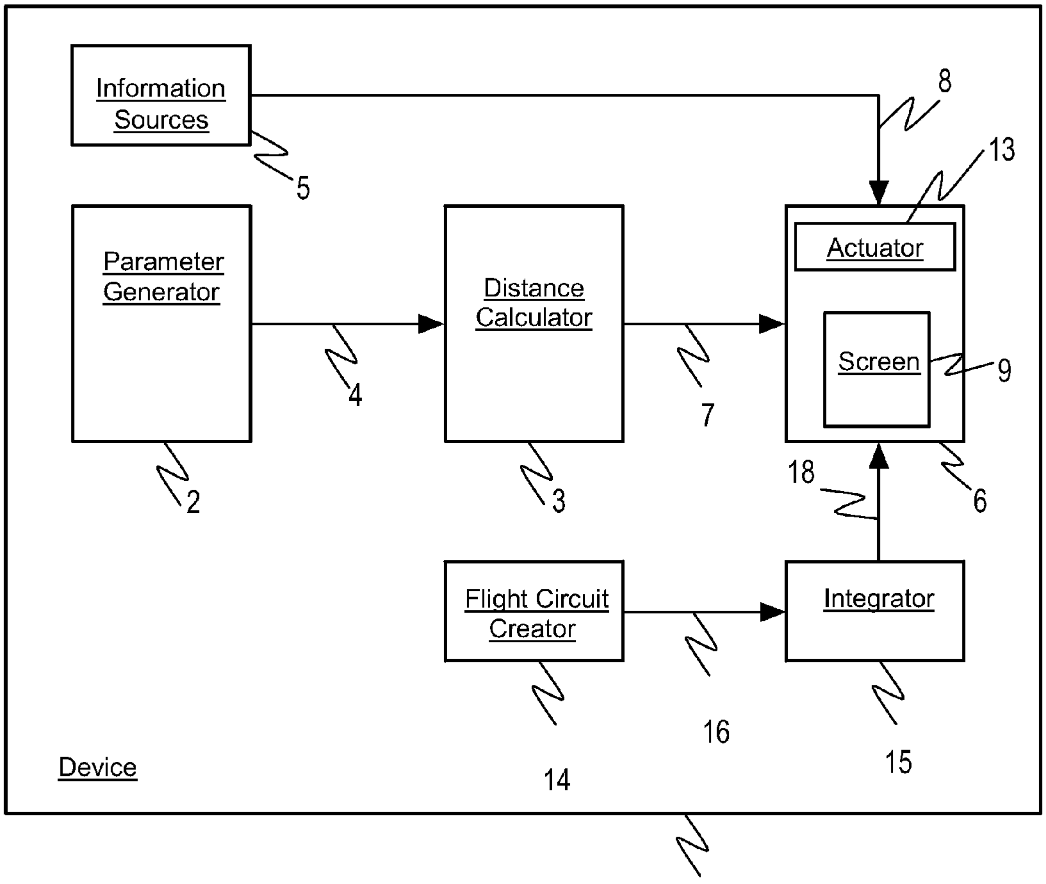
FIG. 1 is the block diagram of a device according to this invention for assisting managing an air meeting phase for an in-flight refueling.

The device 1 according to this invention and schematically shown on FIG. 1 is embedded on board a refueling aircraft A1 and it is intended for assisting the pilot of said refueling aircraft A1 in initiating, in an accurate way and with a reduced work load, an air meeting phase for an in-flight refueling of a receiving aircraft A2 by said refueling aircraft A1.

Figure 2:
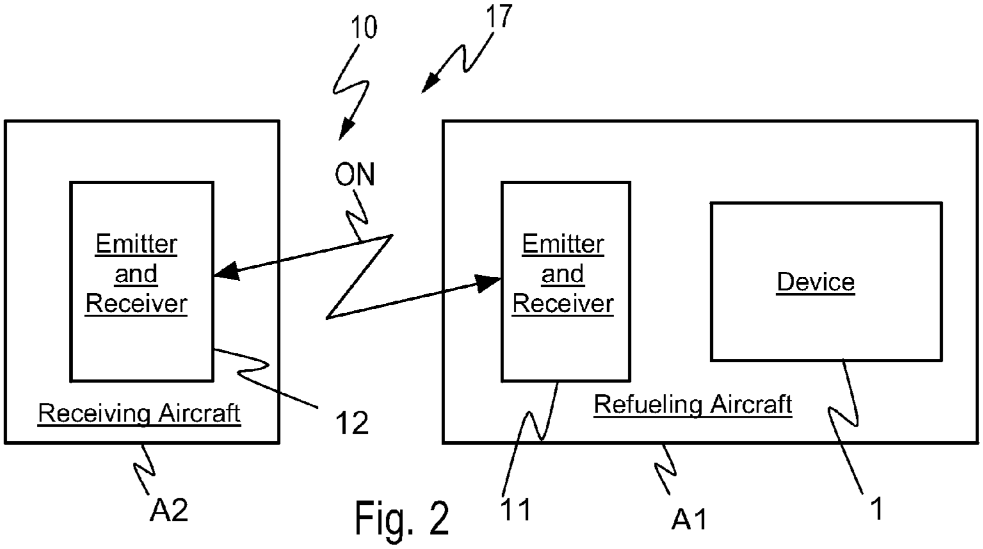
FIG. 2 is the block diagram of a system for assisting an in-flight refueling, according to this invention.

This device 1 is part of a system 17 for assisting an in-flight refueling, as schematically illustrated on FIG. 2 and further described below.

It is known that, generally, an in-flight refueling (the different steps of which are represented on FIGS. 3, 4 and 5) successively comprises the following phases:

- a waiting phase, during which the refueling aircraft A1 is in the air on a waiting circuit C1 waiting for the receiving aircraft A2 flying along this waiting circuit C1. This waiting circuit C1 is in a refueling area ZR, for example at the level of a particular way point P3 of the flight plan being followed by the refueling aircraft A1, as shown on FIG. 3. The points P1, P2, P3 and P4 represent several successive way points of the flight plan of the refueling aircraft A1;
- a meeting phase, during which the two aircrafts A1 and A2 position themselves in order to be able to perform refueling. In order to be able to initiate such an air meeting phase, the two aircrafts A1 and A2 should come closer enough to each other (FIG. 4); and
- a refueling phase as such, during which the two aircrafts A1 and A2 fly together along a refueling circuit C2 (being located in the refueling area ZR) while implementing said refueling, as illustrated on FIG. 5.

Figure 6:
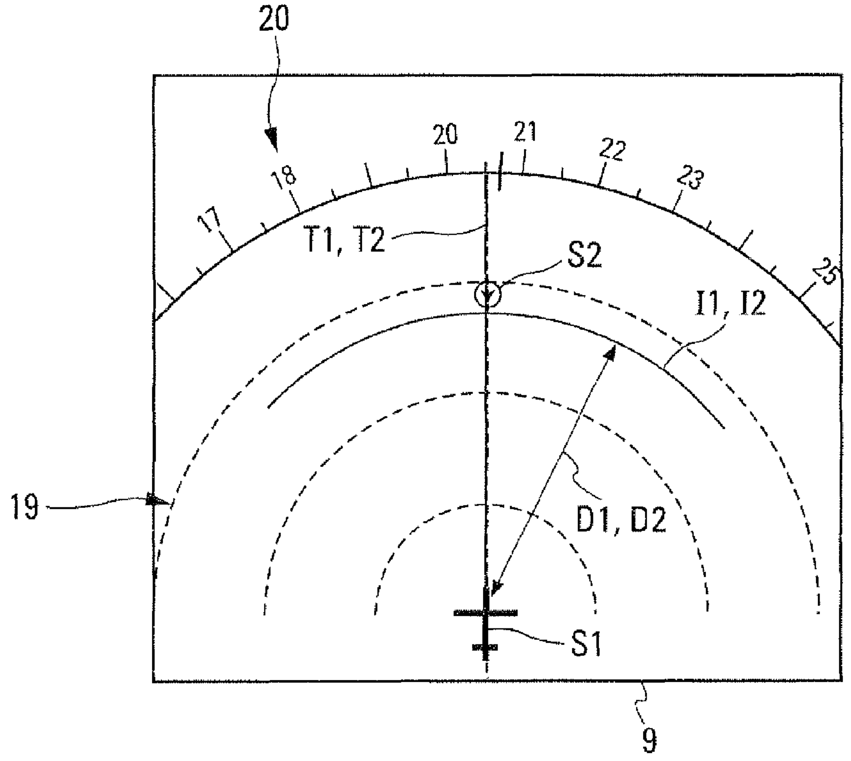
FIG. 6 shows a display as implemented according to this invention for a B or C type meeting.
Figure 9:
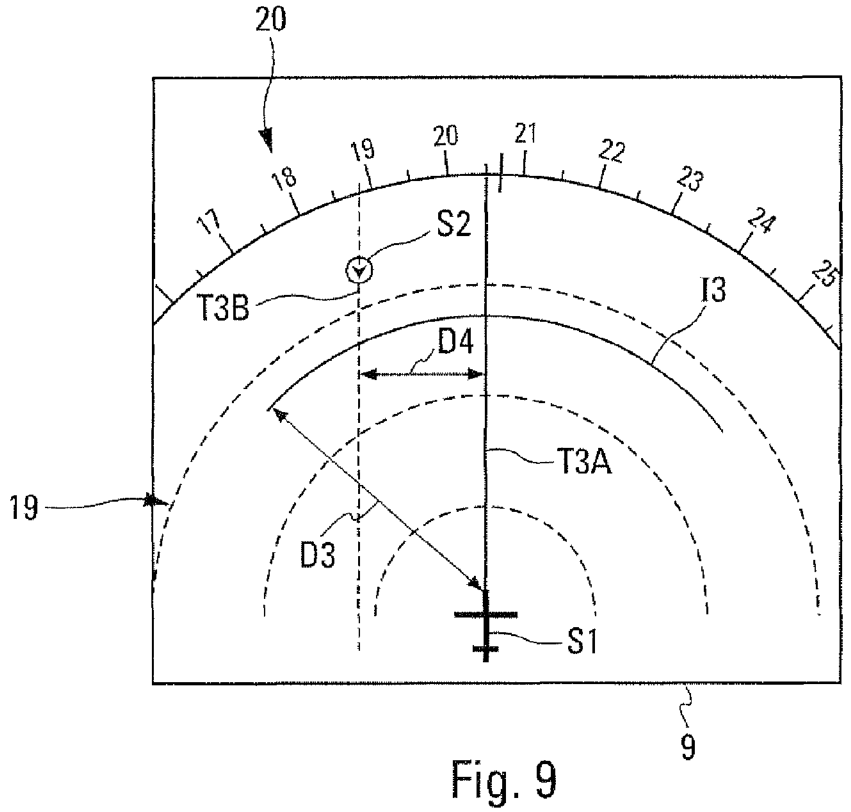
FIG. 9 illustrates a display as implemented according to this invention for a D type meeting.

According to this invention, said device 1 being embedded on the refueling aircraft A1, comprises:

- means 2 for generating a plurality of parameters comprising at least:
  - the current velocity of the refueling aircraft A1;
  - the current altitude of the refueling aircraft A1;
  - the current velocity of the receiving aircraft A2;
  - the current altitude of the receiving aircraft A2;
  - a turn characteristic of the refueling aircraft A1;
  - a turning time of the refueling aircraft A1, taking into account the performance of the latter; and
  - a separation distance R representing the wanted distance between the two aircrafts A1 and A2 at the end of the meeting phase;
- means 3 being connected via a link 4 to said means 2 and being arranged so as to automatically calculate, through said parameters received from said means 2, at least an engagement distance D1, D2, D3 corresponding to the distance between the two aircrafts A1 and A2 at which the meeting phase should be initiated;
- a set 5 of usual information sources, being intended for determining or entering, usually, the current positions of the refueling aircraft A1 and of the receiving aircraft A2; and
- display means 6 being connected via links 7 and 8 respectively to said means 3 and to said set 5 and being arranged so as to automatically show, on at least one viewing screen 9 of said refueling aircraft A1, as shown illustratively on FIGS. 6 and 9, at least:
  - one indicator I1, I2, I3 presenting said engagement distance D1, D2, D3 being defined with respect to the current position of the refueling aircraft A1 (illustrated by a symbol S1), at least at the front of the latter; and
  - one symbol S2 indicating the current position of the receiving aircraft A2. The device 1 also comprises, more specifically at the level of the display means 6, actuating means 13 allowing a pilot to control the display on the viewing screen 9, more specifically, the engagement distance.

Consequently, the device 1 according to this invention automatically determines the engagement distance D1, D2, D3, corresponding to the distance between the two aircrafts A1 and A2 (flying closer and closer to each other) at which the meeting phase should be initiated. The device 1 thus calculates an engagement distance D1, D2, D3 being particularly accurate. Moreover, such an (automatic) calculation does not require a crew member to interfere. This enables to considerably reduce the work load of the crew in the refueling aircraft A1.

Moreover, as said engagement distance D1, D2, D3 is shown under the shape of an indicator I1, I2, I3 (being represented at the front of the current position of the refueling aircraft), the pilot of the refueling aircraft A1 exactly knows when he should initiate the meeting phase. He should initiate it at the time when said indicator I1, I2, I3 is superimposed on a symbol S2 indicating the current position of the receiving aircraft 2, i.e. at the time when the receiving aircraft A2 flying remote from the refueling aircraft A1 during the waiting phase is flying closer to the latter at the so-called engagement distance (as this will be the case in the example of FIG. 6; in the case on FIG. 9, the receiving aircraft A2 is still too remote from the refueling aircraft A1). Thus, the assistance device 1 for managing the air meeting phase enables to significantly reduce the failure rates existing with the usual methods.

The device 1 according to the invention is intended for assisting managing the meeting for the herein after described B, C and D type meeting phases, being implemented, in a completely autonomous way, by the two aircrafts A1 and A2, i.e. no means external to these two aircrafts A1 and A2 interferes in the progress of the meeting phase.

Said device 1 is part of an assistance system 17 for in-flight refueling further comprising data transmitting means 10 between the two aircrafts A1 and A2. Preferably, said data transmitting means 10 comprise means I1 for emitting and receiving ON electromagnetic waves being arranged on the refueling aircraft A1 and cooperating with similar emission and reception means 12, being arranged on the receiving aircraft A2;

Such data transmitting means 10 more specifically allow a crew member of the receiving aircraft A2 to transmit, in particular, its current altitude and its current velocity to a crew member of the receiving aircraft A1 for their use by the means 2.

Said means 2 are preferably usual input means, in particular a keyboard, allowing a crew member of the refueling aircraft A1 to enter the above mentioned parameters. Said means 2 can also be arranged so as to automatically obtain some of the pertinent values, for example being connected to said set 5 of information sources.

In a first embodiment, the device 1 is applied to a B or C type meeting phase, for which it only calculates an engagement distance D1, D2. The display corresponding to such a situation, being implemented on the screen 9, is shown on FIG. 6. This FIG. 6 illustrates a ND (<<Navigation Display>>) type navigation display, in a so-called ARC usual mode, generally comprising, amongst others:

- a symbol S1 illustrating the current position of the refueling aircraft A1, on which the screen 9 is arranged;
- a usual distance scale 19; and
- a usual heading scale 20.

When the symbol S2 representing the receiving aircraft A2 reaches the indicator I1, I2 (FIG. 6) being located at the distance D1, D2 at the front of the current position S1 of the refueling aircraft A1, the pilot of the refueling aircraft A1 should start a constant roll angle turn for initiating the meeting phase.

Figure 7A:
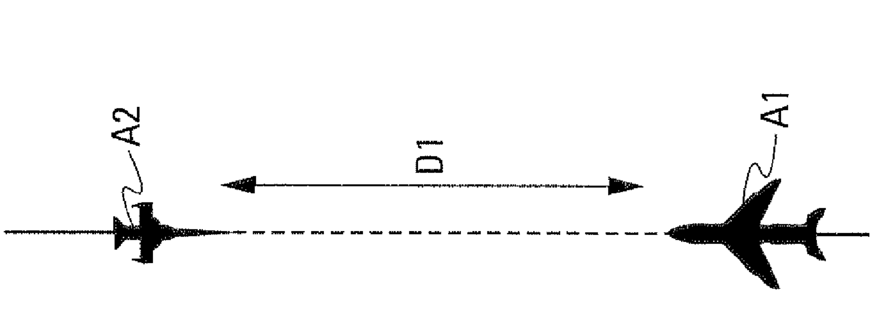
FIGS. 7A, 7B and 7C schematically show the different successive situations upon a B type meeting phase.
Figure 7B:
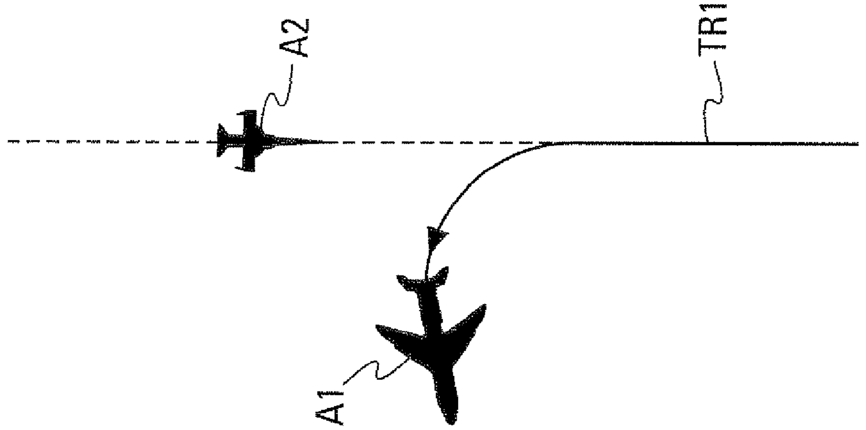
Figure 7C:
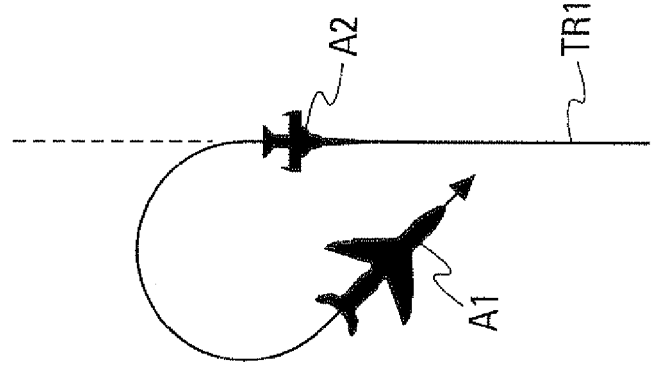

FIGS. 7A, 7B and 7C illustrate a B type (referred to as BRAVO) meeting. Such a meeting suggests that the two aircrafts A1 and A2 face each other (FIG. 7A), along the same trajectory TR1 (represented by a plot T1 on FIG. 6). At the engagement distance D1 calculated by the means 3, the refueling aircraft A1 starts a turn (FIG. 7B) with respect to its initial heading at a constant turn angle, whereas the receiving aircraft A2 remains on its trajectory TR1.

For such a B type procedure, said means 3 of the device 1 calculate the engagement distance D1 using the following equation (1):

$$D1 = \frac{TAS1^2}{g\tan\varphi 1}\left(\frac{TAS2}{TAS1}\frac{3\pi+4}{2} - 2\sqrt{2}\right) + T(TAS2 + TAS1) + R$$

This equation (1) will be explained later on. The parameters being entered using means 2, for this B type procedure, are:

- the current corrected velocity and the current altitude of the refueling aircraft A1, being usually used for determining the true air velocity TAS1 of the refueling aircraft A1;
- the current corrected velocity and the current altitude of the receiving aircraft A2, being usually used to determine the true air velocity TAS2 of the receiving aircraft A2;
- the turn angle ϕ1 of the refueling aircraft A1;
- the time T needed for the refueling aircraft A1 to reach the requested turn angle (from the time when the turning is requested); and
- the separation distance R of the two aircrafts A1 and A2 at the end of the meeting phase.

Furthermore, tan represents the tangent and g the acceleration of the gravity. Taking into account the time T (depending on the performance of the refueling aircraft A1 and being an anticipation time) allows to optimize the calculation of the engagement distance.

The time t1 needed for the refueling aircraft A1 to reach its meeting trajectory TR1, could be expressed as follows:

$$t1 = \frac{1}{TAS1}\left(\frac{5\pi}{4}R1 + L + \frac{\pi}{4}R1\right) + T = \frac{1}{TAS1}\left(\frac{3\pi}{2}R1 + L\right) + T$$

wherein R1 is the turn radius implemented by said aircraft A1 (FIG. 7C). Since L=2R1, the following equation is obtained:

$$t1 = \frac{R1}{TAS1}\left(\frac{3\pi+4}{2}\right) + T$$

The time t2 needed for the receiving aircraft A2 to fly along the meeting trajectory TR1 up to the meeting, could be written as follows:

$$t2 = \frac{1}{TAS2}\left(D1 - T\cdot TAS1 + R1\sin\frac{\pi}{4} + L\cos\frac{\pi}{4} + R1\sin\frac{\pi}{4} - R\right)$$

$$t2 = \frac{1}{TAS2}\left(D1 - T\cdot TAS1 + 2R1\sqrt{2} - R\right)$$

As both times t1 and t2 are equal, it results that:

$$\frac{R1}{TAS1}\left(\frac{3\pi+4}{2}\right) + T = \frac{1}{TAS2}\left(D1 - T\cdot TAS1 + 2R1\sqrt{2} - R\right)$$

The following equations are then obtained:

$$D1 = \frac{TAS2\cdot R1}{TAS1}\left(\frac{3\pi+4}{2}\right) + TAS2\cdot T - 2R1\sqrt{2} + R + T\cdot TAS1$$

$$D1 = R1\left(\frac{TAS2}{TAS1}\frac{3\pi+4}{2} - 2\sqrt{2}\right) + T(TAS2 + TAS1) + R$$

Knowing that $$R1 = \frac{TAS1^2}{g\tan\varphi 1},$$

finally the above mentioned equation (1) is obtained:

$$D1 = \frac{TAS1^2}{g\tan\varphi 1}\left(\frac{TAS2}{TAS1}\frac{3\pi+4}{2} - 2\sqrt{2}\right) + T(TAS2 + TAS1) + R$$

Figure 8A:
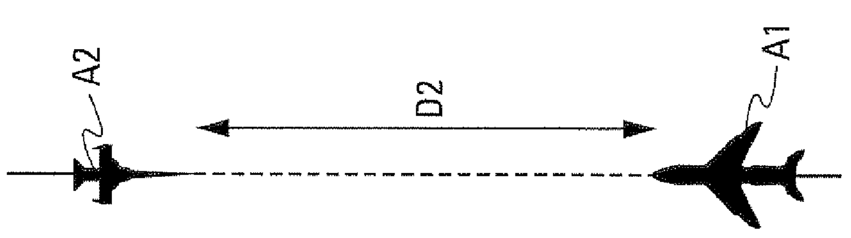
FIGS. 8A, 8B and 8C schematically show the different successive situations during a C type meeting phase.
Figure 8B:
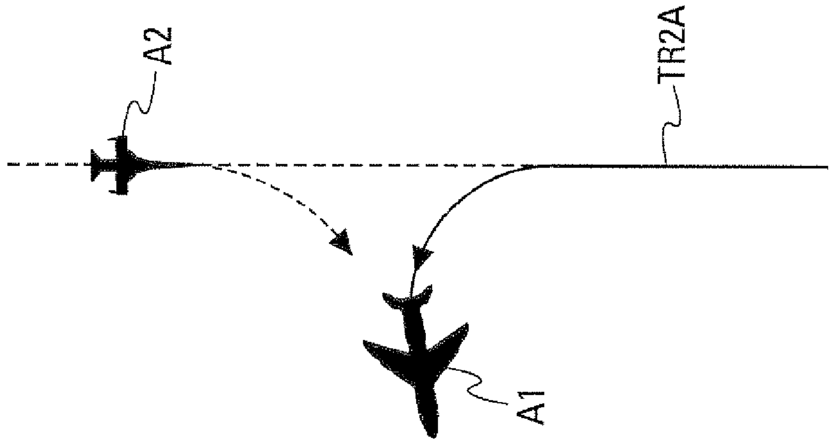
Figure 8C:
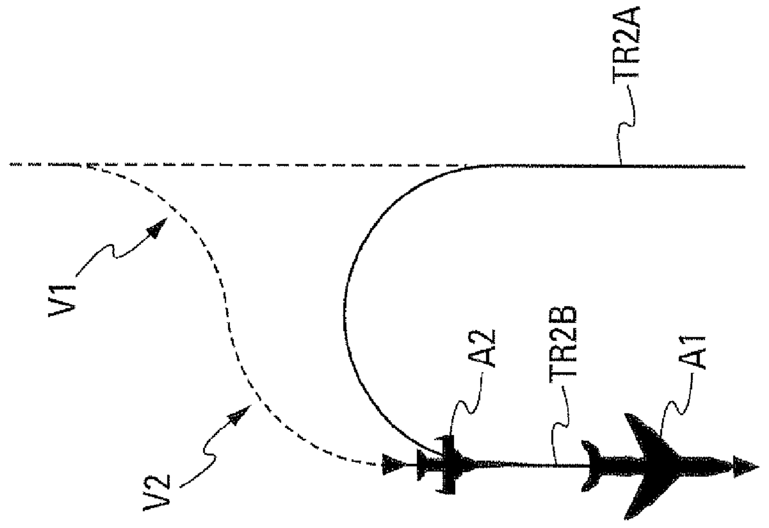

Furthermore, FIGS. 8A, 88 and 8C show different steps of a C type procedure. Such a procedure suggests that the two aircrafts A1 and A2 face each other along the same trajectory TR2A (represented by T2 on FIG. 6). At the engagement distance D2, the refueling aircraft A2 starts a turn (FIG. 8B) with respect to its initial heading at a constant turn angle. The receiving airplane A2 also starts a turn in order to laterally shifted and be located on the same trajectory TR2B et in the same direction as the refueling aircraft A1.

The time t1 needed for the refueling aircraft A1 to reach its meeting trajectory TR2B (coming from TR2A), could be expressed as follows:

$$t1 = \frac{1}{TAS1}(\pi R1 + T\cdot TAS1)$$

wherein R1 is the turn radius implemented by the aircraft A1 (FIG. 8C).

The time t2 needed for the receiving aircraft A2 to reach the meeting trajectory TR2B, could be expressed as follows:

$$t2=\frac{1}{TAS2}\left(2\frac{\pi}{4}R2+L\right)=\frac{1}{TAS2}\left(\frac{\pi}{2}R2+L\right)$$

wherein R2 is the turn radius implemented by the aircraft A2.

The equality of times t1 and t2 enables to obtain L (the length of the right segment between the two turns V1 and V2 implemented by the aircraft A2):

$$\frac{1}{TAS1}(\pi R1+T\cdot TAS1)=\frac{1}{TAS2}\left(\frac{\pi}{2}R2+L\right)$$

Consequently:

$$L=\frac{TAS2}{TAS1}(\pi R1+T\cdot TAS1)-\frac{\pi}{2}R2$$

D2 could be obtained as follows:

$$D2=R2\sin\frac{\pi}{4}+L\cos\frac{\pi}{4}+R2\sin\frac{\pi}{4}+R+T\cdot TAS1$$

This gives:

$$D2=R2\sqrt{2}+L\frac{\sqrt{2}}{2}+R+T\cdot TAS1$$

Injecting L into this equation, the following is obtained:

$$D2=R2\sqrt{2}+\frac{\sqrt{2}}{2}\frac{TAS2}{TAS1}(\pi R1+T\cdot TAS1)-\frac{\sqrt{2}}{2}\frac{\pi}{2}R2+R+T\cdot TAS1$$

$$D2=R2\left(\sqrt{2}-\frac{\pi\sqrt{2}}{4}\right)+R1\frac{\pi\sqrt{2}}{2}\frac{TAS2}{TAS1}+\frac{\sqrt{2}}{2}TAS2\cdot T+R+T\cdot TAS1$$

Consequently:

$$D2=R2\left(\sqrt{2}-\frac{\pi\sqrt{2}}{4}\right)+R1\frac{\pi\sqrt{2}}{2}\frac{TAS2}{TAS1}+T\left(\frac{\sqrt{2}}{2}TAS2+TAS1\right)+R$$

Knowing that $$R1=\frac{TAS1^2}{g\tan\varphi 1}$$

and $$R2=\frac{TAS2^2}{g\tan\varphi 2},$$

$\phi 1$ and $\phi 2$ being the turn angles of the aircrafts A1 and A2 ($\phi 2$ being implemented in the two turns V1 and V2), finally the following equation is obtained to be used by the means 3 for calculating D2:

$$D2=\frac{TAS2^2}{g\tan\varphi 2}\sqrt{2}\left(1-\frac{\pi}{4}\right)+\frac{TAS1\cdot TAS2}{g\tan\varphi 1}\frac{\pi\sqrt{2}}{2}+T\left(\frac{\sqrt{2}}{2}TAS2+TAS1\right)+R$$

On the other hand, in a second embodiment being intended for a D type (referred to as DELTA) procedure, in addition to the engagement distance D3, a lateral distance D4 should be taken into consideration. Moreover, in this embodiment, a crew member selects, through the means 2, a type of turn to be implemented by the refueling aircraft A1 upon the meeting phase. It could be a constant radius turn or a constant roll angle turn.

The choice of the type of turn could depend, more specifically, on the guidance occurring during the meeting phase. More particularly:

- upon an automatic guidance in a managed mode, the pilot should select a constant radius turn; and
- upon a selected mode guidance, the pilot should select a constant roll angle turn.

Figure 4:
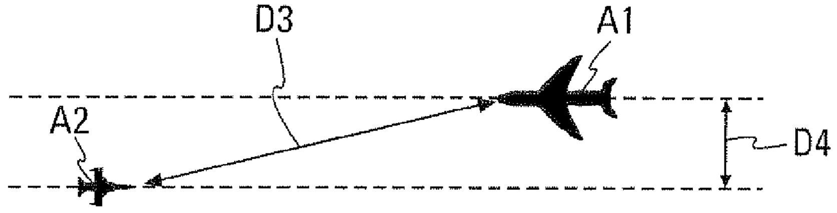
Figure 5:
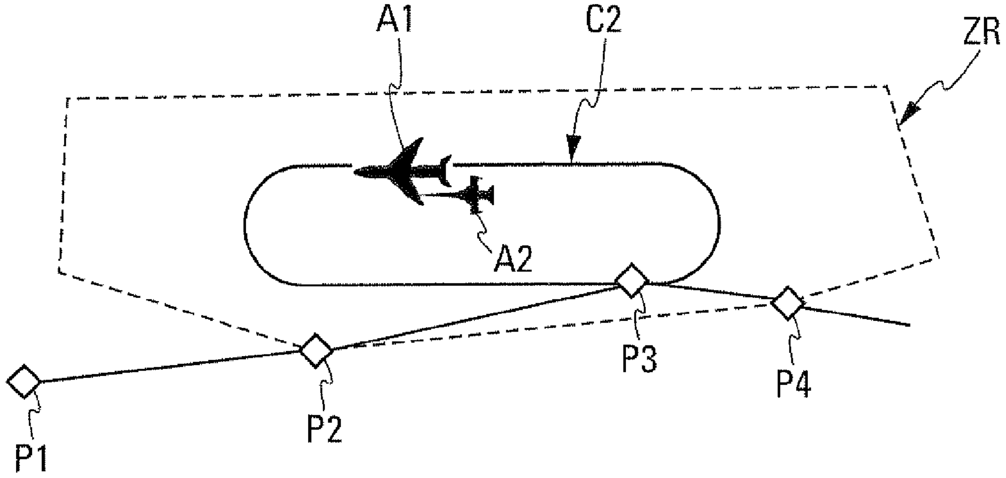
Figure 10A:
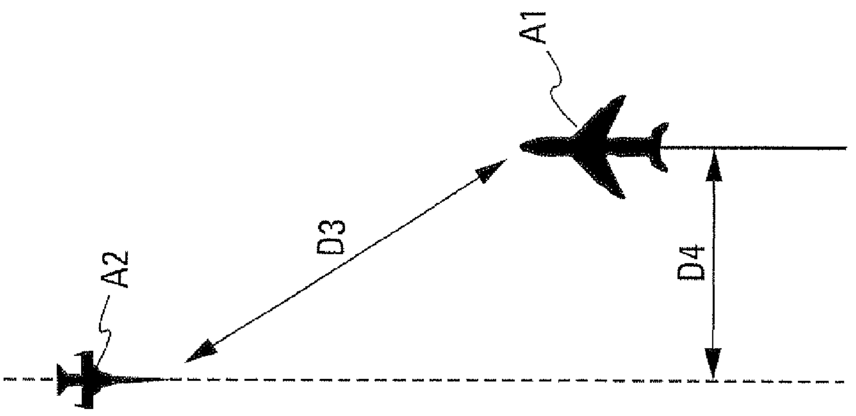
FIGS. 10A, 10B and 10C schematically show the different successive situations upon a D type meeting phase.
Figure 10B:
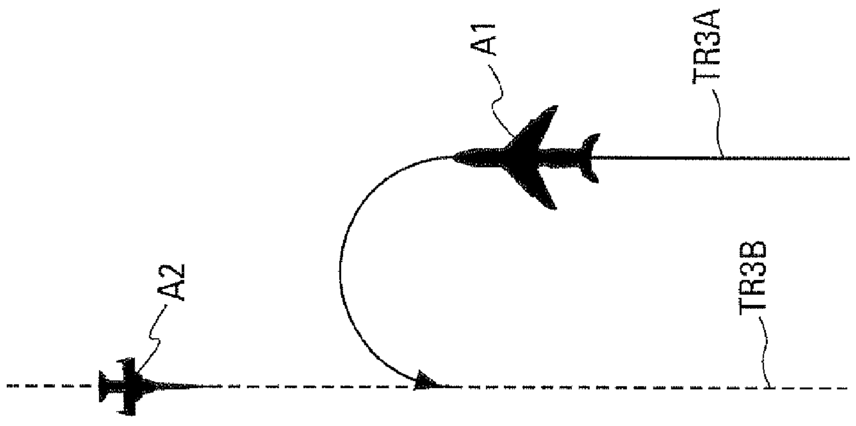
Figure 10C:
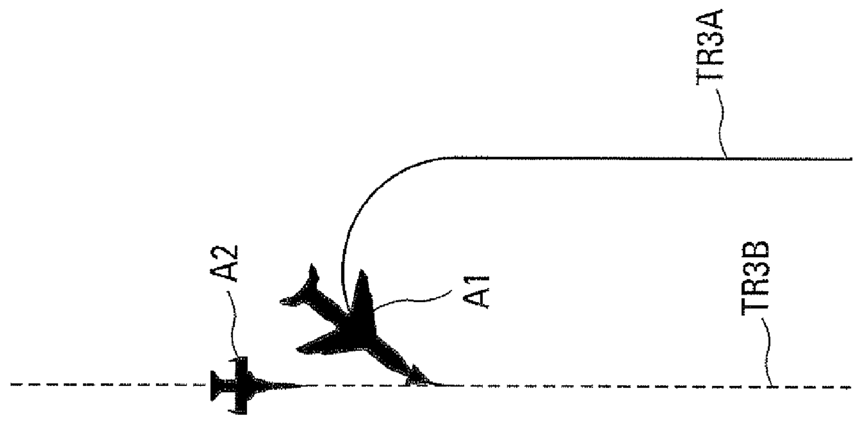

FIGS. 10A, 10B and 10C illustrate such a D type meeting. On FIG. 10A, the two aircrafts A1 and A2 face each other, but on the trajectories TR3A and TR3B (respectively represented by plots T3A and T3B on FIG. 9) being parallel therebetween and laterally shifted by the lateral distance D4 (FIGS. 4 and 10A). At the engagement distance D3, the refueling aircraft A 1 starts a turn (FIG. 10B) with respect to its initial heading so as to reach the trajectory TR3B (FIG. 10C), whereas the receiving aircraft A2 remains on this trajectory TR3B.

The lateral distance D4 can be entered by the pilot through the means 2 or be automatically calculated by the means 3. In the latter case, said means 3 calculate this distance D4 using the following equation:

$$D4=\frac{TAS1^2}{g\tan\varphi 1}((2De+\pi)\sin De+2\cos De)$$

wherein, in addition to the above mentioned parameters, De represents the drift generated by the wind, i.e. the angle between the air velocity and the ground velocity of the refueling aircraft A1. Such a wind corresponds to a wind being captured by the pilot or to the most accurate and reliable wind being available on the refueling aircraft A1.

Additionally, in this second embodiment, said means 3 calculate the engagement distance D3 using the following equation:

$$D3=\sqrt{D4^2+\left(\frac{TAS2\cdot TAS1}{g\tan\varphi 1}(2De+\pi)\cos De+R+T\cdot TAS1\right)^2}$$

Figure 3:
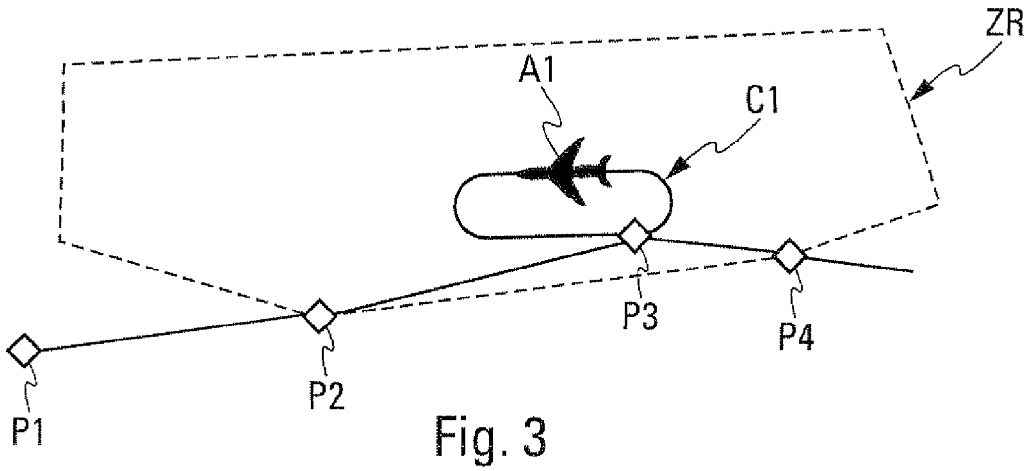
FIGS. 3 to 5 schematically illustrate different characteristics relating to different in-flight refueling phases.

Furthermore, in a particular embodiment, said device 1 further comprises means 14 allowing an operator of said refueling aircraft A1 to create independently two flight circuits, namely a waiting circuit C1 intended to be followed by the refueling aircraft A1 during the waiting phase, as shown on. FIG. 3, and a refueling circuit C2 intended to be followed by said aircrafts A1 and A2 during the refueling phase, as shown on FIG. 5.

Moreover, the device 1 could also comprise means 15 being connected via a link 16 to said means 14 and being arranged so as to allow an operator of said refueling aircraft A1 to integrate into the flight plan thereof one of said two flight circuits C1, C2 as an active element of the flight plan, the other circuit being then considered as inactive. Such integration means 15 could be manual means or automatic means able to automatically integrate a flight circuit C1, C2 into the flight plan when particular conditions are defined, for instance when the distances D3 and D4 have been calculated in the D procedure. A display on the display means 6 could be controlled via a link 18.

In a preferred (not shown) embodiment, a flight circuit, being active, is emphasized on a viewing screen, for instance on the screen 9, by a drawing and/or a particular colour, for instance a green solid line. As far as the inactive flight circuit is concerned, it could:

either be emphasized by a drawing and/or a particular colour, for instance a blue dashed line plot, in particular for the refueling circuit during the waiting phase;

or not be displayed. This could be the case, for instance, for the waiting circuit upon the refueling phase.

The invention claimed is:

1. An assistance process for managing on a refueling aircraft an air meeting phase with a receiving aircraft, for an in-flight refueling of said receiving aircraft by said refueling aircraft, said refueling and receiving aircrafts flying one towards the other, comprising, on said refuelling aircraft:

a) generating, by a processor, a plurality of parameters comprising at least:

a current velocity of the refueling aircraft;

a current altitude of the refueling aircraft;

a current velocity of the receiving aircraft;

a current altitude of the receiving aircraft;

a turn characteristic of the refueling aircraft;

a turning time taking into account the performance of the refueling aircraft; and a separation distance of the two aircrafts at the end of the meeting phase;

b) using said parameters to automatically calculate, by a processor, at least one engagement distance corresponding to the distance between the two aircrafts at which the meeting phase should be initiated, wherein for a B type procedure, the engagement distance is calculated using the equation:

$$D1=\frac{TAS1^2}{g\tan\varphi 1}\left(\frac{TAS2}{TAS1}\frac{3\pi+4}{2}-2\sqrt{2}\right)+T(TAS2+TAS1)+R,$$

wherein for a C type procedure, the engagement distance is calculated using the equation:

$$D2=\frac{TAS2^2}{g\tan\varphi 2}\sqrt{2}\left(1-\frac{\pi}{4}\right)+\frac{TAS1\cdot TAS2}{g\tan\varphi 1}\frac{\pi\sqrt{2}}{2}+T\left(\frac{\sqrt{2}}{2}TAS2+TAS1\right)+R$$

wherein for a D type procedure, the engagement distance is calculated using the equation:

$$D3=\sqrt{D4^2+\left(\frac{TAS2\cdot TAS1}{g\tan\varphi 1}(2De+\pi)\cos De+R+T\cdot TAS1\right)^2}$$

where TAS1 is a true air velocity of the refuelling aircraft, TAS2 is a true air velocity of the receiving aircraft, T is a time needed for the refuelling aircraft to reach any requested turn angle, R is a separation distance between the refuelling aircraft and the receiving aircraft, g represents the acceleration of gravity, and De represents drift generated by wind;

c) determining, by a processor, the current positions of said refueling and receiving aircrafts; and d) automatically showing on at least one viewing screen of the refueling aircraft, at least:

one indicator showing said at least one engagement distance being defined with respect to the current position of the refueling aircraft, at least at the front of the latter; and one symbol indicating the current position of the receiving aircraft.

2. A process according to claim 1, wherein, for a meeting phase corresponding to one of the following procedures: a B type procedure and a C type procedure, there is generated in step a), as a turn characteristic, the constant value of the turn angle, to be implemented by the refueling aircraft at the start of the meeting phase.

3. A process according to claim 1,wherein, for a meeting phase corresponding to a D type procedure:

in step a), one of the following turns is selected: a constant radius turn and a constant roll angle turn; and in addition, a lateral distance is determined between the respective trajectories of the refueling and receiving aircrafts, being parallel, said lateral distance being used for calculating said at least one engagement distance.

4. A process according to claim 3, wherein said lateral distance is automatically calculated, taking into account a drift generated by the wind.

5. An assistance method for an in-flight refueling of a receiving aircraft by a refueling aircraft, said refueling successively comprising a waiting phase for the refueling aircraft; a meeting phase; and a refueling phase, wherein, during said waiting phase, on the refueling aircraft, an assistance process for managing the meeting phase is used to manage the meeting phase, the assistance process comprising:

a) generating, by a processor, a plurality of parameters comprising at least:

a current velocity of the refueling aircraft;

a current altitude of the refueling aircraft;

a current velocity of the receiving aircraft;

a current altitude of the receiving aircraft;

a turn characteristic of the refueling aircraft;

a turning time taking into account the performance of the refueling aircraft; and a separation distance of the two aircrafts at the end of the meeting phase;

b) using said parameters to automatically calculate, by a processor, at least one engagement distance corresponding to the distance between the two aircrafts at which the meeting phase should be initiated, wherein for a B type procedure, the engagement distance is calculated using the equation:

$$D1=\frac{TAS1^2}{g\tan\varphi 1}\left(\frac{TAS2}{TAS1}\frac{3\pi+4}{2}-2\sqrt{2}\right)+T(TAS2+TAS1)+R,$$

wherein for a C type procedure, the engagement distance is calculated using the equation:

$$D2=\frac{TAS2^2}{g\tan\varphi 2}\sqrt{2}\left(1-\frac{\pi}{4}\right)+\frac{TAS1\cdot TAS2}{g\tan\varphi 1}\frac{\pi\sqrt{2}}{2}+T\left(\frac{\sqrt{2}}{2}TAS2+TAS1\right)+R$$

wherein for a D type procedure, the engagement distance is calculated using the equation:

$$D3 = \sqrt{D4^2 + \left(\frac{TAS2 \cdot TAS1}{g\tan\varphi 1}(2De + \pi)\cos De + R + T \cdot TAS1\right)^2}$$

where TAS1 is a true air velocity of the refuelling aircraft, TAS2 is a true air velocity of the receiving aircraft, T is a time needed for the refuelling aircraft to reach any requested turn angle, R is a separation distance between the refuelling aircraft and the receiving aircraft, g represents the acceleration of gravity, and De represents drift generated by wind;

c) determining, by a processor, the current positions of said refueling and receiving aircrafts; and d) automatically showing on at least one viewing screen of the refueling aircraft, at least:

one indicator showing said at least one engagement distance being defined with respect to the current position of the refueling aircraft, at least at the front of the latter; and one symbol indicating the current position of the receiving aircraft.

6. A method according to claim 5, wherein an operator of said refueling aircraft creates independently two flight circuits, namely a waiting circuit intended to be followed by the refueling aircraft during the waiting phase and a refueling circuit intended to be followed by said refueling aircraft during the refueling phase.

7. A method according to claim 6, wherein on the refueling aircraft, one of said two flight circuits is integrated into the flight plan as an active element of the flight plan, and the other circuit is integrated into the flight plan as an inactive element of the flight plan.

8. A method according to claim 7, wherein a flight circuit is automatically integrated into the flight plan.

9. An assistance device for managing on a refueling aircraft an air meeting phase with a receiving aircraft, for an in-flight refueling of said receiving aircraft by said refueling aircraft, said refueling and receiving aircrafts flying one towards the other, wherein said device is on board said refueling aircraft said device comprising:

parameter generator adapted to generate a plurality of parameters comprising at least:

a current velocity of the refueling aircraft;

a current altitude of the refueling aircraft;

a current velocity of the receiving aircraft;

a current altitude of the receiving aircraft;

a turn characteristic of the refueling aircraft;

a turning time taking into account the performance of the refueling aircraft; and a separation distance of the two aircrafts at the end of the meeting phase;

calculator adapted to automatically calculate, through said parameters, at least one engagement distance corresponding to the distance between the two aircrafts at which the meeting phase should be initiated, wherein for a B type procedure, the engagement distance is calculated using the equation:

$$D1 = \frac{TAS1^2}{g\tan\varphi 1}\left(\frac{TAS2}{TAS1}\frac{3\pi + 4}{2} - 2\sqrt{2}\right) + T(TAS2 + TAS1) + R,$$

wherein for a C type procedure, the engagement distance is calculated using the equation:

$$D2 = \frac{TAS2^2}{g\tan\varphi 2}\sqrt{2}\left(1 - \frac{\pi}{4}\right) + \frac{TAS1 \cdot TAS2}{g\tan\varphi 1}\frac{\pi\sqrt{2}}{2} + T\left(\frac{\sqrt{2}}{2}TAS2 + TAS1\right) + R$$

wherein for a D type procedure, the engagement distance is calculated using the equation:

$$D3 = \sqrt{D4^2 + \left(\frac{TAS2 \cdot TAS1}{g\tan\varphi 1}(2De + \pi)\cos De + R + T \cdot TAS1\right)^2}$$

where TAS1 is a true air velocity of the refuelling aircraft, TAS2 is a true air velocity of the receiving aircraft, T is a time needed for the refuelling aircraft to reach any requested turn angle, R is a separation distance between the refuelling aircraft and the receiving aircraft, g represents the acceleration of gravity, and De represents drift generated by wind;

position determiner adapted to determine the current positions of said refueling and receiving aircrafts; and display means for automatically showing, on at least one viewing screen of the refueling aircraft, at least:

one indicator showing said at least one engagement distance being defined with respect to the current position of the refueling aircraft, at least at the front of the latter; and one symbol indicating the current position of the receiving aircraft.

10. An assistance device according to claim 9, wherein for a meeting phase corresponding to one of the following procedures: a B type procedure and a C type procedure, there is generated, as a turn characteristic, the constant value of the turn angle, to be implemented by the refueling aircraft at the start of the meeting phase.

11. An assistance device according to claim 9, wherein, for a meeting phase corresponding to a D type procedure:

one of the following turns is selected: a constant radius turn and a constant roll angle turn; and in addition, a lateral distance is determined between the respective trajectories of the refueling and receiving aircrafts, being parallel, said lateral distance being used for calculating said at least one engagement distance.

12. An assistance device according to claim 11, wherein said lateral distance is automatically calculated, taking into account a drift generated by the wind.

13. An assistance system for an in-flight refueling of a receiving aircraft by a refueling aircraft, wherein said refueling successively comprises a waiting phase for the refueling aircraft; a meeting phase; and a refueling phase, the assistance system comprising;

an assistance device for managing the meeting phase, the assistance device comprising:

a parameter generator adapted to generate a plurality of parameters comprising at least:

a current velocity of the refueling aircraft;

a current altitude of the refueling aircraft;

a current velocity of the receiving aircraft;

a current altitude of the receiving aircraft;

a turn characteristic of the refueling aircraft;

a turning time taking into account the performance of the refueling aircraft; and a separation distance of the two aircrafts at the end of the meeting phase;

a calculator adapted to automatically calculate, through said parameters, at least one engagement distance corresponding to the distance between the two aircrafts at which the meeting phase should be initiated, wherein for a B type procedure, the engagement distance is calculated using the equation:

$$D1 = \frac{TAS1^2}{g\tan\varphi 1}\left(\frac{TAS2}{TAS1}\frac{3\pi+4}{2} - 2\sqrt{2}\right) + T(TAS2 + TAS1) + R,$$

wherein for a C type procedure, the engagement distance is calculated using the equation:

$$D2 = \frac{TAS2^2}{g\tan\varphi 2}\sqrt{2}\left(1 - \frac{\pi}{4}\right) + \frac{TAS1 \cdot TAS2}{g\tan\varphi 1}\frac{\pi\sqrt{2}}{2} + T\left(\frac{\sqrt{2}}{2}TAS2 + TAS1\right) + R$$

wherein for a D type procedure, the engagement distance is calculated using the equation:

$$D3 = \sqrt{D4^2 + \left(\frac{TAS2 \cdot TAS1}{g\tan\varphi 1}(2De + \pi)\cos De + R + T \cdot TAS1\right)^2}$$

where TAS1 is a true air velocity of the refuelling aircraft, TAS2 is a true air velocity of the receiving aircraft, T is a time needed for the refuelling aircraft to reach any requested turn angle, R is a separation distance between the refuelling aircraft and the receiving aircraft, g represents the acceleration of gravity, and De represents drift generated by wind;

a position determiner adapted to determine the current positions of said refueling and receiving aircrafts; and display means for automatically showing, on at least one viewing screen of the refueling aircraft, at least:

one indicator showing said engagement distance being defined with respect to the current position of the refueling aircraft, at least at the front of the latter; and one symbol indicating the current position of the receiving aircraft.

14. An assistance process for managing on a refueling aircraft an air meeting phase with a receiving aircraft, for an in-flight refueling of said receiving aircraft by said refueling aircraft, said refueling and receiving aircrafts flying one towards the other, the assistance process comprising, on said refuelling aircraft:

a) generating, by a processor, a plurality of parameters comprising at least:

a current velocity of the refueling aircraft;

a current altitude of the refueling aircraft;

a current velocity of the receiving aircraft;

a current altitude of the receiving aircraft;

a turn characteristic of the refueling aircraft;

a turning time taking into account the performance of the refueling aircraft; and a separation distance of the two aircrafts at the end of the meeting phase;

b) using said parameters to automatically calculate, by a processor, at least one engagement distance corresponding to the distance between the two aircrafts at which the meeting phase should be initiated, wherein for a B type procedure, the engagement distance is calculated using the equation:

$$D1 = \frac{TAS1^2}{g\tan\varphi 1}\left(\frac{TAS2}{TAS1}\frac{3\pi+4}{2} - 2\sqrt{2}\right) + T(TAS2 + TAS1) + R,$$

wherein for a C type procedure, the engagement distance is calculated using the equation:

$$D2 = \frac{TAS2^2}{g\tan\varphi 2}\sqrt{2}\left(1 - \frac{\pi}{4}\right) + \frac{TAS1 \cdot TAS2}{g\tan\varphi 1}\frac{\pi\sqrt{2}}{2} + T\left(\frac{\sqrt{2}}{2}TAS2 + TAS1\right) + R$$

wherein for a D type procedure, the engagement distance is calculated using the equation:

$$D3 = \sqrt{D4^2 + \left(\frac{TAS2 \cdot TAS1}{g\tan\varphi 1}(2De + \pi)\cos De + R + T \cdot TAS1\right)^2}$$

where TAS1 is a true air velocity of the refuelling aircraft, TAS2 is a true air velocity of the receiving aircraft, T is a time needed for the refuelling aircraft to reach any requested turn angle, R is a separation distance between the refuelling aircraft and the receiving aircraft, g represents the acceleration of gravity, and De represents drift generated by wind;

c) determining, by a processor, the current positions of said refueling and receiving aircrafts; and d) automatically showing on at least one viewing screen of the refueling aircraft, at least:

one indicator showing said at least one engagement distance being defined with respect to the current position of the refueling aircraft, at least at the front of the latter; and one symbol indicating the current position of the receiving aircraft, wherein steps a) through d) are performed using an assistance device for managing on the refueling aircraft the air meeting phase, wherein said device is on board said refueling aircraft and comprises:

parameter generator adapted to generate a plurality of parameters comprising at least:

the current velocity of the refueling aircraft;

the current altitude of the refueling aircraft;

the current velocity of the receiving aircraft;

the current altitude of the receiving aircraft;

a turn characteristic of the refueling aircraft;

a turning time taking into account the performance of the refueling aircraft; and a separation distance of the two aircrafts at the end of the meeting phase;

calculator adapted to automatically calculate, through said parameters, at least one engagement distance corresponding to the distance between the two aircrafts at which the meeting phase should be initiated;

position determiner adapted to determine the current positions of said refueling and receiving aircrafts; and display means for automatically showing, on at least one viewing screen of the refueling aircraft, at least:

one indicator showing said engagement distance being defined with respect to the current position of the refueling aircraft, at least at the front of the latter;

one symbol indicating the current position of the receiving aircraft.

* * * * *